(12) United States Patent
Jacobson et al.

(10) Patent No.: US 9,400,800 B2
(45) Date of Patent: *Jul. 26, 2016

(54) DATA TRANSPORT BY NAMED CONTENT SYNCHRONIZATION

(71) Applicant: Palo Alto Research Center Incorporated, Palo Alto, CA (US)

(72) Inventors: Van L. Jacobson, Woodside, CA (US); Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 475 days.

This patent is subject to a terminal disclaimer.

(21) Appl. No.: 13/681,306

(22) Filed: Nov. 19, 2012

(65) Prior Publication Data

US 2014/0143446 A1 May 22, 2014

(51) Int. Cl.
*G06F 17/30* (2006.01)
*H04L 29/08* (2006.01)

(52) U.S. Cl.
CPC ...... *G06F 17/30174* (2013.01); *H04L 67/1095* (2013.01)

(58) Field of Classification Search
CPC ............ G06F 17/30174; G06F 17/30575; G06F 17/30578; G06F 17/30581; H04L 67/1095; H04L 45/02; H04L 45/021
USPC ........... 707/610–639; 709/203, 217, 219, 248
See application file for complete search history.

(56) References Cited

U.S. PATENT DOCUMENTS

| 817,441 | A | 4/1906 | Niesz |
|---|---|---|---|
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Tzanetakis et al., "A Scalable Peer-to-Peer System for Music Information Retrieval," Computer Music Journal, vol. 28, No. 2, Jun. 2004, pp. 24-33.*

(Continued)

*Primary Examiner* — Vivek Srivastava
*Assistant Examiner* — William C McBeth
(74) *Attorney, Agent, or Firm* — Shun Yao; Park, Vaughan, Fleming & Dowler LLP

(57) ABSTRACT

A collection-synchronizing system synchronizes a local data collection with a remote device. During operation, the system can detect the remote device, and receives collection summaries for one or more data collections stored at the remote device. A collection summary can include at least one additive hash value that represents one or more content items of a data collection. Then, for a data collection that exists at the local device and the remote device, the system compares a remote additive hash value for the remote data collection with a local additive hash value for the local data collection. If the system determines that the local additive hash value does not match the remote additive hash value, the system synchronizes structured names for the data collection at the local device and the remote device.

21 Claims, 8 Drawing Sheets

(56) References Cited

U.S. PATENT DOCUMENTS

| | | |
|---|---|---|
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,543,064 B2 | 6/2009 | Juncker |
| 7,552,233 B2 | 6/2009 | Raju |
| 7,555,563 B2 | 6/2009 | Ott |
| 7,567,547 B2 | 7/2009 | Mosko |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,332,357 B1 * | 12/2012 | Chung ............... G06F 17/30174 707/634 |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,862,774 B2 | 10/2014 | Vasseur |
| 8,937,865 B1 | 1/2015 | Kumar |
| 9,071,498 B2 | 6/2015 | Beser |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Paterka |
| 2003/0167318 A1 * | 9/2003 | Robbin et al. ............... 709/221 |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0246902 A1 * | 12/2004 | Weinstein ............... H04L 45/02 370/238 |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |

(56) References Cited

U.S. PATENT DOCUMENTS

| | | | |
|---|---|---|---|
| 2007/0276907 A1 | 11/2007 | Maes | |
| 2008/0005056 A1 | 1/2008 | Stelzig | |
| 2008/0005195 A1* | 1/2008 | Li | 707/203 |
| 2008/0010366 A1 | 1/2008 | Duggan | |
| 2008/0037420 A1 | 2/2008 | Tang | |
| 2008/0043989 A1 | 2/2008 | Furutono | |
| 2008/0046340 A1 | 2/2008 | Brown | |
| 2008/0059631 A1 | 3/2008 | Bergstrom | |
| 2008/0080440 A1 | 4/2008 | Yarvis | |
| 2008/0101357 A1 | 5/2008 | Iovanna | |
| 2008/0107034 A1 | 5/2008 | Jetcheva | |
| 2008/0123862 A1 | 5/2008 | Rowley | |
| 2008/0133583 A1 | 6/2008 | Artan | |
| 2008/0133755 A1 | 6/2008 | Pollack | |
| 2008/0151755 A1 | 6/2008 | Nishioka | |
| 2008/0159271 A1 | 7/2008 | Kutt | |
| 2008/0186901 A1 | 8/2008 | Itagaki | |
| 2008/0200153 A1 | 8/2008 | Fitzpatrick | |
| 2008/0215669 A1 | 9/2008 | Gaddy | |
| 2008/0216086 A1 | 9/2008 | Tanaka | |
| 2008/0243992 A1 | 10/2008 | Jardetzky | |
| 2008/0256359 A1 | 10/2008 | Kahn | |
| 2008/0270618 A1 | 10/2008 | Rosenberg | |
| 2008/0287142 A1 | 11/2008 | Keighran | |
| 2008/0288580 A1 | 11/2008 | Wang | |
| 2008/0320148 A1 | 12/2008 | Capuozzo | |
| 2009/0006489 A1* | 1/2009 | Ramasubramanian et al. | 707/201 |
| 2009/0013324 A1 | 1/2009 | Gobara | |
| 2009/0022154 A1 | 1/2009 | Kiribe | |
| 2009/0024641 A1 | 1/2009 | Quigley | |
| 2009/0030978 A1 | 1/2009 | Johnson | |
| 2009/0037763 A1 | 2/2009 | Adhya | |
| 2009/0052660 A1 | 2/2009 | Chen | |
| 2009/0067429 A1 | 3/2009 | Nagai | |
| 2009/0077184 A1 | 3/2009 | Brewer | |
| 2009/0092043 A1 | 4/2009 | Lapuh | |
| 2009/0097631 A1 | 4/2009 | Gisby | |
| 2009/0103515 A1 | 4/2009 | Pointer | |
| 2009/0113068 A1 | 4/2009 | Fujihira | |
| 2009/0144300 A1 | 6/2009 | Chatley | |
| 2009/0144343 A1* | 6/2009 | Holt et al. | 707/203 |
| 2009/0157887 A1 | 6/2009 | Froment | |
| 2009/0185745 A1 | 7/2009 | Momosaki | |
| 2009/0193101 A1 | 7/2009 | Munetsugu | |
| 2009/0222344 A1 | 9/2009 | Greene | |
| 2009/0228593 A1 | 9/2009 | Takeda | |
| 2009/0254572 A1 | 10/2009 | Redlich | |
| 2009/0268905 A1 | 10/2009 | Matsushima | |
| 2009/0274158 A1* | 11/2009 | Sharp | H04L 67/1095 370/400 |
| 2009/0285209 A1 | 11/2009 | Stewart | |
| 2009/0287835 A1 | 11/2009 | Jacobson | |
| 2009/0288163 A1 | 11/2009 | Jacobson | |
| 2009/0300079 A1 | 12/2009 | Shitomi | |
| 2009/0300407 A1 | 12/2009 | Kamath | |
| 2009/0307333 A1 | 12/2009 | Welingkar | |
| 2009/0323632 A1 | 12/2009 | Nix | |
| 2010/0005061 A1 | 1/2010 | Basco | |
| 2010/0027539 A1 | 2/2010 | Beverly | |
| 2010/0030840 A1* | 2/2010 | O'Shea et al. | 709/201 |
| 2010/0046546 A1 | 2/2010 | Ram | |
| 2010/0057929 A1 | 3/2010 | Merat | |
| 2010/0088370 A1 | 4/2010 | Wu | |
| 2010/0098093 A1 | 4/2010 | Ejzak | |
| 2010/0100465 A1 | 4/2010 | Cooke | |
| 2010/0103870 A1 | 4/2010 | Garcia-Luna-Aceves | |
| 2010/0124191 A1 | 5/2010 | Vos | |
| 2010/0131660 A1 | 5/2010 | Dec | |
| 2010/0150155 A1 | 6/2010 | Napierala | |
| 2010/0165976 A1 | 7/2010 | Khan | |
| 2010/0169478 A1 | 7/2010 | Saha | |
| 2010/0169503 A1 | 7/2010 | Kollmansberger | |
| 2010/0180332 A1 | 7/2010 | Ben-Yochanan | |
| 2010/0182995 A1 | 7/2010 | Hwang | |
| 2010/0185753 A1 | 7/2010 | Liu | |
| 2010/0195653 A1 | 8/2010 | Jacobson | |
| 2010/0195654 A1 | 8/2010 | Jacobson | |
| 2010/0195655 A1 | 8/2010 | Jacobson | |
| 2010/0217874 A1 | 8/2010 | Anantharaman | |
| 2010/0232402 A1 | 9/2010 | Przybysz | |
| 2010/0232439 A1 | 9/2010 | Dham | |
| 2010/0235516 A1 | 9/2010 | Nakamura | |
| 2010/0246549 A1 | 9/2010 | Zhang | |
| 2010/0250497 A1 | 9/2010 | Redlich | |
| 2010/0250939 A1 | 9/2010 | Adams | |
| 2010/0257149 A1* | 10/2010 | Cognigni | G06F 17/30575 707/698 |
| 2010/0268782 A1 | 10/2010 | Zombek | |
| 2010/0272107 A1 | 10/2010 | Papp | |
| 2010/0284309 A1 | 11/2010 | Allan | |
| 2010/0284404 A1 | 11/2010 | Gopinath | |
| 2010/0293293 A1 | 11/2010 | Beser | |
| 2010/0322249 A1 | 12/2010 | Thathapudi | |
| 2011/0013637 A1 | 1/2011 | Xue | |
| 2011/0022812 A1 | 1/2011 | vanderLinden | |
| 2011/0055392 A1 | 3/2011 | Shen | |
| 2011/0055921 A1 | 3/2011 | Narayanaswamy | |
| 2011/0090908 A1 | 4/2011 | Jacobson | |
| 2011/0106755 A1 | 5/2011 | Hao | |
| 2011/0137916 A1* | 6/2011 | Deen et al. | 707/747 |
| 2011/0145597 A1 | 6/2011 | Yamaguchi | |
| 2011/0145858 A1 | 6/2011 | Philpott | |
| 2011/0153840 A1 | 6/2011 | Narayana | |
| 2011/0161408 A1 | 6/2011 | Kim | |
| 2011/0202609 A1 | 8/2011 | Chaturvedi | |
| 2011/0219093 A1* | 9/2011 | Ragunathan | G06F 15/16 709/248 |
| 2011/0231578 A1 | 9/2011 | Nagappan | |
| 2011/0239256 A1 | 9/2011 | Gholmieh | |
| 2011/0258049 A1 | 10/2011 | Ramer | |
| 2011/0264824 A1 | 10/2011 | Venkata Subramanian | |
| 2011/0265174 A1 | 10/2011 | Thornton | |
| 2011/0271007 A1 | 11/2011 | Wang | |
| 2011/0286457 A1 | 11/2011 | Ee | |
| 2011/0286459 A1 | 11/2011 | Rembarz | |
| 2011/0299454 A1 | 12/2011 | Krishnaswamy | |
| 2012/0011551 A1 | 1/2012 | Levy | |
| 2012/0036180 A1 | 2/2012 | Thornton | |
| 2012/0066727 A1 | 3/2012 | Nozoe | |
| 2012/0106339 A1 | 5/2012 | Mishra | |
| 2012/0114313 A1 | 5/2012 | Phillips | |
| 2012/0120803 A1 | 5/2012 | Farkas | |
| 2012/0136936 A1 | 5/2012 | Quintuna | |
| 2012/0136945 A1 | 5/2012 | Lee | |
| 2012/0141093 A1 | 6/2012 | Yamaguchi | |
| 2012/0155464 A1 | 6/2012 | Kim | |
| 2012/0158973 A1 | 6/2012 | Jacobson | |
| 2012/0163373 A1 | 6/2012 | Lo | |
| 2012/0173656 A1* | 7/2012 | Sorenson, III | 709/217 |
| 2012/0179653 A1 | 7/2012 | Araki | |
| 2012/0197690 A1 | 8/2012 | Agulnek | |
| 2012/0198048 A1 | 8/2012 | Ioffe | |
| 2012/0221150 A1 | 8/2012 | Arensmeier | |
| 2012/0224487 A1 | 9/2012 | Hui | |
| 2012/0233490 A1* | 9/2012 | Barton et al. | 713/503 |
| 2012/0257500 A1 | 10/2012 | Lynch | |
| 2012/0290669 A1 | 11/2012 | Parks | |
| 2012/0290919 A1 | 11/2012 | Melnyk | |
| 2012/0291102 A1 | 11/2012 | Cohen | |
| 2012/0314580 A1 | 12/2012 | Hong | |
| 2012/0317307 A1 | 12/2012 | Ravindran | |
| 2012/0331112 A1 | 12/2012 | Chatani | |
| 2013/0041982 A1 | 2/2013 | Shi | |
| 2013/0051392 A1 | 2/2013 | Filsfils | |
| 2013/0060962 A1 | 3/2013 | Wang | |
| 2013/0061084 A1* | 3/2013 | Barton | H04L 67/1095 713/400 |
| 2013/0073552 A1 | 3/2013 | Rangwala | |
| 2013/0074155 A1 | 3/2013 | Huh | |
| 2013/0110987 A1 | 5/2013 | Kim | |
| 2013/0111063 A1 | 5/2013 | Lee | |
| 2013/0151584 A1 | 6/2013 | Westphal | |
| 2013/0163426 A1 | 6/2013 | Beliveau | |

(56) References Cited

U.S. PATENT DOCUMENTS

| | | |
|---|---|---|
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0074783 A1* | 3/2014 | Alsina et al. ............ 707/624 |
| 2014/0082135 A1 | 3/2014 | Jung |
| 2014/0089454 A1 | 3/2014 | Jeon |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0120663 A1* | 4/2015 | Le Scouarnec ... G06F 17/30174 707/638 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Zahn et al., "Feasibility of Content Dissemination Between Devices in Moving Vehicles," Proceedings of the 5th International Conference on Emerging Networking Experiments and Technologies, Dec. 2009, pp. 97-108.*

Le Merrer et al., "Bitbox: Eventually Consistent File Sharing," Lecture Notes in Computer Science, vol. 7853, 2013, pp. 274-278.*

Zhu et al., "Let's ChronoSync: Decentralized Dataset State Synchronization in Named Data Networking", 21st IEEE International Conference on Network Protocols, Oct. 7-10, 2013, pp. 1-10.*

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

(56) References Cited

OTHER PUBLICATIONS

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks,' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Ateniese, K. Fu, M. Green, and S. Hohenberger. Improved Proxy Reencryption Schemes with Applications to Secure Distributed Storage. In the 12th Annual Network and Distributed System Security Sympo.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision—Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer Sciencevol. 5443 (2009).

V. Jacobson et al., 'Networking Named Content,' Proc. IEEE CoNEXT '09, Dec. 2009.

Jacobson, Van et al. 'VoCCN: Voice Over Content-Centric Networks.' Dec. 1, 2009. ACM ReArch'09.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

(56) References Cited

OTHER PUBLICATIONS

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology -AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S.Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari,Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

(56) References Cited

OTHER PUBLICATIONS

Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
J. Lotspiech, S. Nusser, and F. Pestoni. Anonymous Trust: Digital Rights Management using Broadcast Encryption. Proceedings of the IEEE 92.6 (2004).
S. Kamara and K. Lauter. Cryptographic Cloud Storage. Financial Cryptography and Data Security. Springer Berlin Heidelberg (2010).
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
lshiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

\* cited by examiner

DATA TRANSPORT BY NAMED CONTENT SYNCHRONIZATION

BACKGROUND

1. Field

This disclosure is generally related to data synchronization. More specifically, this disclosure is related to comparing additive hash values that represent collections of content item names to determine whether a local data collection and a remote data collection are synchronized.

2. Related Art

In many computing applications, it is often important for two remote data collections to synchronize their data if their collections are not in agreement. However, to determine an agreement level between the two remote data collections, these two computer systems may need to exchange information based on a substantially large sample of their data.

A commonly used measure of the agreement between two collections A and B of data objects (files) is the "overlap." This overlap can be computed as the number of objects in the intersection of A and B divided by the number of objects in the union ($|A \cap B|/|A \cup B|$), which will be a real number between 0 and 1. Individual data objects are typically represented by checksums that are computed from the contents of the data objects, for example 128-bit hash function values. If two checksums agree, it is highly likely that the two data objects also agree. Unfortunately, computing the checksums for large data files can consume substantial processing time.

To estimate the overlap between a local data collection A and a remote data collection B, a computer system may receive some or all of the checksums for the data objects in the remote collection B, and compare these checksum values to those for local collection A. However, the overlap estimate may be highly inaccurate unless all the checksums are transferred, and communicating these checksum values for the remote data collection can involve a high-bandwidth file transfer operation.

Some overlap-estimation systems reduce the amount of communication by using min-wise hashing to generate a sketch vector. In this technique, there is a set of n universally known hash functions, $h_1, h_2, \ldots, h_n$, that are used to generate n hash values for each of the data objects in a collection A. The collection A is then represented by a "sketch" vector of n numbers that are generated from these hash values, and the overlap of collections A and B can be estimated by the overlap of their sketches. Unfortunately, generating the sketch vector can consume substantial processing time for large files, given that it requires generating a plurality of different hash values from the data files' contents.

SUMMARY

One embodiment provides a system that synchronizes a data collection with a remote device. During operation, the system can detect the remote device, for example, by detecting that the local device and the remote device are in close proximity to each other, or detecting a data connection between the local device and the remote device. Then, in response to detecting the remote device, the system receives collection summaries for one or more data collections stored at the remote device. A respective collection summary can include at least one additive hash value that represents one or more content items of a data collection. Then, for a data collection that exists at the local device and the remote device, the system compares a remote additive hash value for the data collection at the remote device with a local additive hash value for the data collection at the local device.

If the system determines that the remote additive hash value does not match the local additive hash value, the system synchronizes structured names for the data collection at the local device and the remote device. A structured name indicates a unique and persistent name for a content item independent of a storage location, and facilitates obtaining the content item from any device of a computer network.

In some embodiments, while synchronizing the persistent names, the system compares the remote additive hash value to one or more historical hash values for the data collection at the local device. If the system determines that the remote additive hash value matches a historical hash value of the local data collection, the system identifies a set of content items that have been added to the local data collection after the matching historical hash value was generated, and sends structured names for the identified content items to the remote device.

In some embodiments, the local device stores one or more nested hash values for the data collection, such that a nested hash value indicates a hash value for a content item of the data collection or for a nested collection of content items of the data collection. Further, the collection summary received from the remote device can also include one or more nested hash values from the remote device.

In some embodiments, while synchronizing the structured names, the system compares the remote additive hash value to one or more historical hash values for the data collection at the local device. If the system determines that the received additive hash value matches a historical hash value for the data collection at the local device, then the system determines that the remote collection is a subset of the local collection. It may send to the remote system the set of names added since the historical hash value. Otherwise, the system can determine a set difference between the hash values for content items in the local and remote data collections. The system uses the hash values of the set difference to determine structured names for content items from the local data collection that are missing from the remote device's data collection, and sends these structured names to the remote device.

In some embodiments, the system receives a filter from the remote device, such that the filter indicates selection criteria for selecting content items that are desired by the remote device. The system then determines a set of content items from the local data collection that satisfy the filter's selection criteria, and generates the additive hash value using the content items that satisfy the filter's selection criteria.

In some embodiments, while synchronizing the structured names with the remote device, the system generates a filtered collection of content items that includes, from the content items that satisfy the filter's selection criteria, one or more content items that are missing from the remote data collection. The system sends structured names for content items in the filtered collection to the remote device.

In some embodiments, while synchronizing the structured names with the remote device, the system sends to the remote device a collection summary for a data collection at the local device. The system can receive structured names for one or more content items stored at the remote device that are missing at the local device, and stores the received structured names in the local data collection.

In some embodiments, the system sends an interest packet for at least one of the received structured names to a network node of a computer network. The interest packet facilitates receiving a content item identified by the structured name from any computing device of a computer network that stores the content item.

In some embodiments, after synchronizing the structured names, the system generates and stores one or more additive hash values for the data collection at the local device based on the received structured names for the content items missing at the local device.

BRIEF DESCRIPTION OF THE FIGURES

In the figures, like reference numerals refer to the same figure elements.

DETAILED DESCRIPTION

Figure 1:
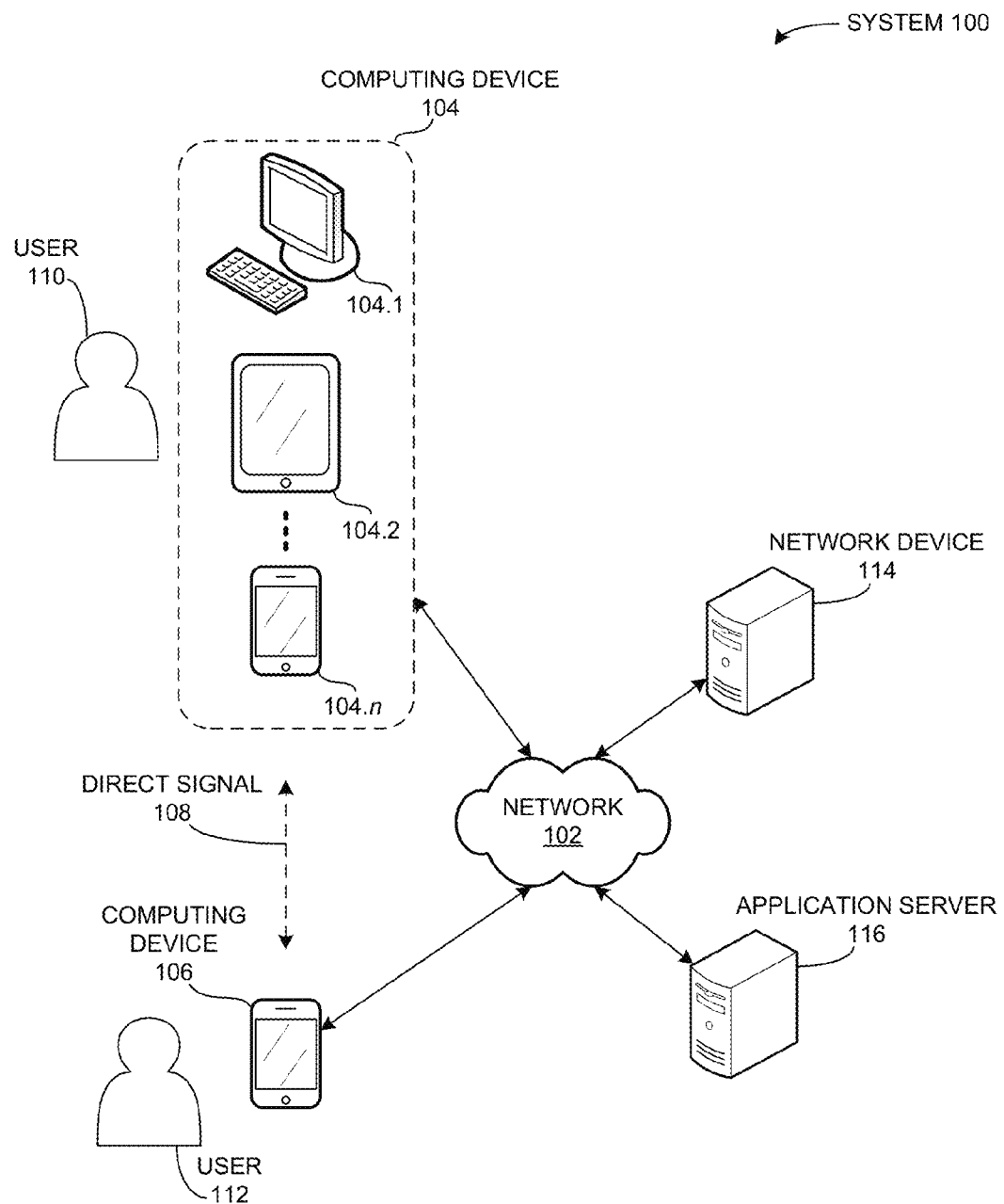
FIG. 1 illustrates an exemplary system that synchronizes a data collection using a content-centric network in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of providing a collection-synchronization system that can automatically synchronize collection data between computing devices that are subscribed to a common data collection. For example, a local computing device can store a plurality of content items that are organized into one or more collections of data. A user of the device can subscribe to a collection of data, and the device can synchronize this collection with other devices that are also subscribed to this data collection (e.g., other nearby devices).

In a content-centric network (CCN), a data collection can correspond to a namespace, and a namespace can correspond to one or more structured names. Further, each structured name is unique and persistent with respect to a certain content item. The namespace includes at least part of a content name which can be used to match content items with a more specific name that falls logically within the scope of the namespace.

Because a content item's structured name is unique and persistent, the system can generate a hash value for each content item based on the structured name, without having to process the data for each content item which can be significantly larger in size (e.g., bytes) than the structured names. The system can also generate an additive hash value for each data collection, based on the hash values for the individual content items of the data collection, so that the additive hash value represents the contents of the data collection. For example, the system can generate the additive hash value by using an addition operation (or some other mathematical function) to process the hash values for the individual content items of the data collection.

To synchronize data collections with a remote device, the local device can provide to the remote device a collection summary that includes at least a recent additive hash value for each collection. The local device can receive a collection summary from the remote device as well. If the local device detects a difference in an additive hash value for a data collection, the local and remote devices can engage in a collection-synchronization operation to resolve the discrepancy in their data collections.

In some embodiments, data is persistent at each computing device. For example, to remove a content item from a data collection, the device adds an empty "whiteout" item to the collection using this content item's name. This whiteout item includes a unique structured name so that it can be added to the collection without overriding the content item's structured name. For example, the whiteout item can have a prefix that matches the content item's structured name, and can have a suffix that indicates that the content item has been removed from the collection. Further, the whiteout item is "empty" in the sense that it does not store data, and so the whiteout item does not occupy a significant amount of storage space. Once the system generates the whiteout item, the system can also remove the data from the content item without removing the structured name for the content item. This way, the device can store a history of content items that have been stored by the device in the past.

In some embodiments, the local device can determine whether a remote device's data collection is an older version of the local device's collection by determining whether the collection of structured names for the content items at the remote device are a subset of the collection of structured names for the content items at the local device. However, performing a cross-comparison between the structured names at the local and remote devices can be a computationally expensive task. To avoid having to perform this expensive cross-comparison operation, the local device can store historical hash values (e.g., additive hash values that have become outdated) for the local data collection. Then, the local device can determine whether the remote device's data collection is an older version (e.g., a subset of the local data collection) by determining whether the additive hash value from the remote device matches a historical hash value for the local data collection.

In some embodiments, a device can use a filter to indicate a subset of content items within a remote collection that are to be synchronized. To use the filter, the local and remote devices agree upon a set of filters that are to be used to select content items. The local and remote devices then exchange collection summaries that represent the content items of their local collection that satisfy the filter's selection criteria. The local and remote devices use these collection summaries to determine whether their collections are synchronized, and/or to determine which content items need to be exchanged.

The collection-synchronization protocol is inherently a multi-party protocol that does not require the various computing devices to have synchronized clocks, and does not require a computing device to store persistent state information for other devices. When two devices have synchronized collections, the device can use a synchronization operation to detect the synchronized state with an O(1) runtime per collection. The communications cost of the synchronization operation also has an O(1) runtime, because the device only needs to transfer one additive hash value per collection. When collections are out-of-sync, the local device can synchronize the local and remote collections with an O(log n) runtime, where n is the number of content items in the collection.

FIG. 1 illustrates an exemplary system 100 that synchronizes a data collection using a content-centric network in accordance with an embodiment. System 100 can include a computing device 104 that can communicate with a remote computing device 106 via a network 102 or a direct signal 108. Computing devices 104 can include, for example, a desktop computer 104.1, a tablet 104.2, a mobile phone 104.n, a laptop, a home media center, or any other computing device.

In some embodiments, devices 104 and 106 can each subscribe to various collections of content items. For example, user 110 may use device 104 to subscribe to data collections such as bicycling/gear, running/events/Bay_Area, and ACME/projects. The "bicycling/gear" collection can include content related to bicycling gear, such as product reviews, product advertisements, pictures, usage tutorials, and user-generated content. The "running/events/Bay_Area" collection may include any content related to running events within the San Francisco Bay Area, such as new event information, services related to an upcoming running event, images and videos from past events, and discussion content. The "ACME/projects" collection can include content related to projects at the ACME Corporation, the employer of user 110.

As a further example, users 110 and 112 may also be subscribed to the "cooking" collection, and may periodically meet with each other to discuss new recipes. The "cooking" collection can include a plurality of recipes, pictures, instructional videos, and user-generated content (e.g., pictures, videos, and comments). User 110 may use computing device 104 to download new recipes from network 102 (e.g., the Internet). Sometimes user 110 may also modify existing recipes to create a new version of an old recipe, or user 110 may create and store new recipes of his own. Further, user 112 may similarly use computing device 106 to download, modify, and/or create recipes of his own.

Because users 110 and 112 are friends, they may have given each other's devices permission to exchange collection data with each other. When users 110 and 112 meet with each other, computing devices 104 and 106 may detect their proximity to each other and may automatically synchronize their collections. This automatic synchronization allows computing devices 104 and 106 to learn about new content from the "cooking" data collection so that users 110 and 112 can discuss this content during their meeting, or at a later date.

Device 104 can detect device 106 by detecting direct signal 108 from device 106 (e.g., a Bluetooth signal, a WiFi signal, or an RFID signal). In some other embodiments, device 104 can detect device 106 via a third-party system, such as application server 116. For example, devices 104 and 106 may periodically send their updated location information (e.g., GPS coordinates) to application server 116 that provides location-based services. Then, if devices 104 and 106 are in close proximity to each other (or are tied to a similar context or activity, such as traveling to the same location), application server 116 can inform computing devices 104 and 106 that they can benefit from synchronizing their data collections.

Recall that computing devices 104 and 106 store content in their data collections by assigning a structured name that is unique and persistent to each piece of content. The structured name can indicate a namespace hierarchy for the content item, a name (e.g., a filename) for the content item, information that indicates a version of the content item (e.g., a checksum value), and authentication information for the content. In some embodiments, computing devices 104 and 106 can synchronize their data collections by synchronizing the structured names to the content items in their collections. After synchronizing the content names for a data collection, computing device 104 can obtain the new content items behind these content names directly from computing device 106 while devices 104 and 106 have a direct connection. Alternatively, computing device 104 can obtain a new content item at any time by broadcasting an interest packet via network 102. This can allow computing device 104 to obtain the desired content item from any device connected to network 102 (e.g., from computing device 106, or from any other network device 114).

Figure 2:
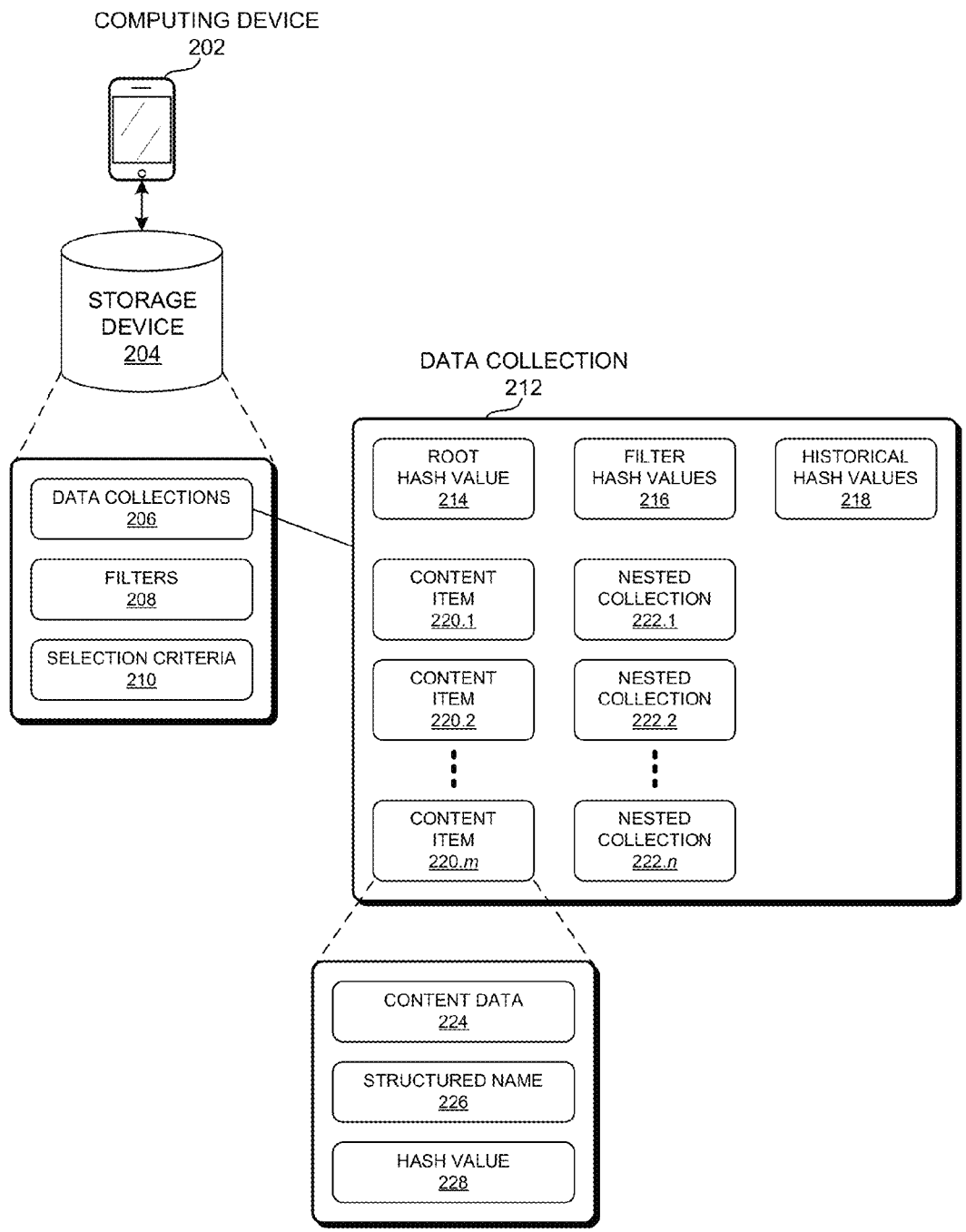
FIG. 2 illustrates an exemplary computing device that stores a data collection in accordance with an embodiment.

FIG. 2 illustrates an exemplary computing device 202 that stores a data collection in accordance with an embodiment. Device 202 can include a storage device 204 that stores at least a plurality of data collections 206, and can store filters 208. Storage device 204 can include a hard drive, a solid state device, and/or any other non-volatile storage medium now known or later developed.

A filter can indicate selection criteria for selecting one or more content items that are to be accounted for in a collection summary for a remote user. In some embodiments, storage device 204 can include a predetermined set of selection criteria 210 for use by each filter. Table 1 presents a plurality of exemplary selection criteria in accordance with an embodiment.

TABLE 1

| Selection Criteria | Description |
| --- | --- |
| 1. No Videos | Collection Summary does not account for video files. |
| 2. No Image Files | Collection Summary does not account for image files. |
| 3. No Audio Files | Collection Summary does not account for audio files. |
| 4. Maximum 10 MB file size | Collection Summary does not account for files larger than 10 MB. |

Device 202 can receive filters 208 from various other devices that have synchronized their data collections with device 202 in the past. By storing filters 208, device 202 can use filters 208 over time to generate a record of how hash values for data collections 206 have changed over time (e.g., historical hash values 218 for data collection 212). Device 202 can compare these historical hash values to hash values of a remote data collection to determine whether the remote data collection matches an older version of the local data collection. If so, the system can determine that the remote data collection is a subset of the local data collection.

Data collections 206 can include one or more data collections to which the local user has subscribed. A data collection 212, for example, can include content items 220, and can include nested data collections 222 that can also include other content items. Further, data collection 212 can also include a plurality of additive hash values that represent content items 220 and nested collections 222. For example, data collection 212 can include a root hash value 214, filter hash values 216, and historical hash values 218. In some embodiments, a nested collection (e.g., nested collection 222.n) can also include other content items and nested collections, and can include additive hash values for the nested content items (e.g., a root hash value, filter hash values, historical hash values).

A content item (e.g., content item 220.m) can include content data 224, a structured name 226 for content data 224, and a hash value 228 for content data 224. Recall that structured name 226 is unique and persistent to the current version of content data 224. In some embodiments, device 202 generates hash value 228 by processing structured name 226 using a one-way hash function, which is significantly faster than generating a hash value from content data 224.

Device 202 can generate additive hash values for data collection 212 when device 202 synchronizes the local data collection with a remote data collection, or when device 202 receives a new filter from a remote device. Further, device 202 can assign a timestamp to each root hash value and filter hash value (e.g., for data collection 212 or for a nested data collection 222). In some embodiments, device 202 can use these timestamps to distinguish between current hash values and historical hash values. In some other embodiments, prior to generating a new root hash value or a filter hash value, device 202 may migrate the existing root hash value and filter hash values into a data store for historical hash values. For example, the system can store these hash values within a database table for historical hash values, or within a nested collection or directory that it reserves for historical hash values.

To generate root hash value 214, device 202 can combine the hash values from content items 220 and the root hash values from nested collections 222. For example, device 202 can combine these hash values by performing an addition operation on these hash values, or by performing some other mathematical function. Further, device 202 can generate a filter hash value for each of filters 208 by first recursively generating a filter hash value for each of nested collections 222. Then, device 202 can combine these filter hash values for nested collection 222 with hash values for content items 220 that satisfy the filter's selection criteria (e.g., using an addition operation, or using some other mathematical function).

Named Content

Recall that the system can associate a persistent structured name (a content identifier) with a content item of a data collection. The term "persistent" means that the content item can move around within a computing device, or across different computing devices, but the name persists with the content. This enables a computing device to generate an interest in a piece of content to obtain the content from wherever it may reside.

The term "persistent" also means that if the content changes, then the name changes. The new name can be automatically generated as a version of the original name, can be associated with authentication metadata (e.g., a digital signature by the publisher of the content), or can reflect the nature of the content change.

A structured name can be divided into several hierarchical components. For example, in the name "/parc/home/ccn/test.txt," the individual name components are parc, home, ccn, and test.txt. Note that "PARC" is an acronym for "Palo Alto Research Center," an exemplary organization used in this disclosure. Structured names also enable efficient routing for named content. A component-wise structure allows a hierarchical organization of names, and a logarithmic efficiency in accessing content by name. There is no single "root" for a naming scheme. However, the naming scheme can be modeled as a forest of trees. Names can be structured in various ways. For example, the structured names can be structured in a left-oriented prefix-major fashion. For example, the name "/parc/home/ccn" can be a "parent" of "/parc/home/ccn/test."

In some embodiments, the system can store a data collection by following a hierarchical data structure that is derived from the collection's naming scheme, without following the collection's naming scheme explicitly. For example, if a collection or nested collection corresponding to a given domain or sub-domain were to have a significantly large set of nested items (e.g., "/parc/home/ccn/" may have 1000 nested items or more), the system can lexicographically sort the names for the nested items, and group them into sub-collections so that any nested sub-collection itself has a constrained maximum number of nested items (e.g., less than 1000 items). Doing so could cause the item named "/parc/home/ccn/test" to be stored within a data collection along the path "/parc/home/ccn/t/."

Name components can be binary strings and can be opaque to the underlying network. More generally, a semantic meaning to a name component is an agreement or convention between name producers and consumers. Names can also be text or in a form where low-level network nodes can understand the meaning of "special" name components. In some embodiments, the semantic meaning of a name component can be defined by a rule that indicates which content items are to belong to a corresponding data collection or sub-collection. The rule can specify, for example, "all files under the '/share' namespace or directory of storage drive X," "all content items published by Adam," and/or any rule that generates a specific set of names given to a device's content store.

A "file" is represented by a tree of content items under the file's name. For example, if various versions of the same file exist, these various versions can exist within the same prefix of the structured name. If the file (or a version of the file) is deleted, this deletion operation can be represented by adding an additional item under this prefix that indicates the deletion. This way, a deletion is performed by adding items to a data collection, rather than by deleting items from the data collection. If a data collection becomes unsynchronized at two devices, A and B, after an item is deleted at device A, the collection at device B becomes a subset of the collection at device A because it does not have the new "deletion" content item. Also, the system can determine that a content item is missing from its node in the data collection, without having to analyze its constituent data blocks (which could be large for multimedia files).

In sum, the system associates persistent structured names with content items. Because of this naming convention, a content item can be addressed, located, retrieved, cached, and disseminated by its name. To obtain content data that is associated with a structured name, the system can publish an interest in the structured name, and can receive the content item from any device that has the content item of the same structured name.

Synchronizing Data Collections

Figure 3:
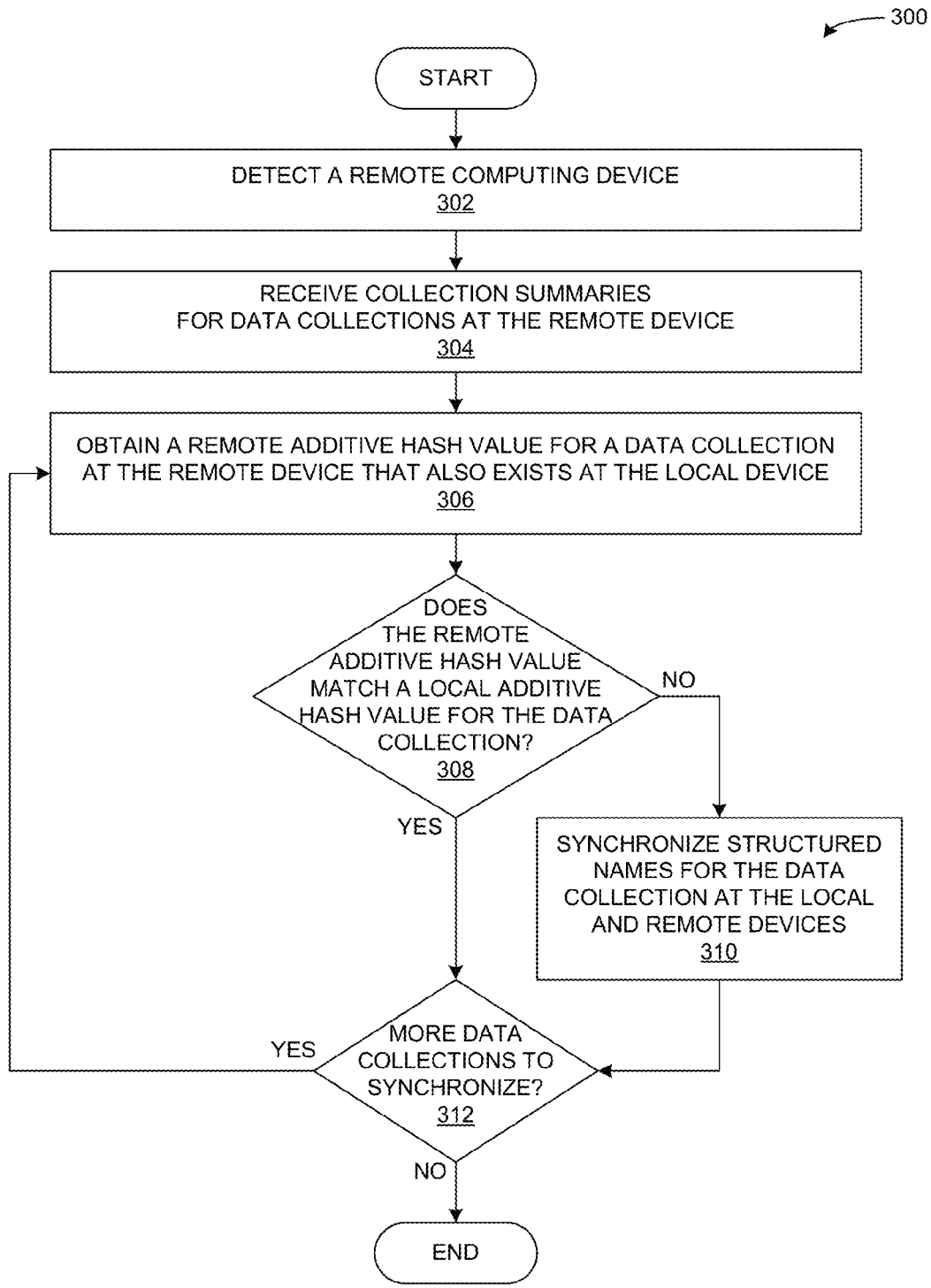
FIG. 3 presents a flow chart illustrating a method for synchronizing a data collection between a local computing device and a remote computing device in accordance with an embodiment.

FIG. 3 presents a flow chart illustrating a method 300 for synchronizing a data collection between a local computing device and a remote computing device in accordance with an embodiment. The system begins by detecting a remote computing device (operation 302), and receiving collection summaries for data collections at the remote device (operation 304). The collection summary can include additive hash values for the data collections stored at the remote device. In some embodiments, the system sends collection names for one or more data collections that the local device is interested in, and receives collection summaries for these data collections only.

The system then obtains additive hash values (e.g., from a collection summary) for a data collection at the remote device that also exists at the local device (operation 306). These additive hash values can include a root hash value for the complete data collection, which facilitates the local device to determine whether the remote data collection matches the current or a previous version of the local data collection.

In some embodiments, the system can send a filter to the remote device (e.g., during or after operation 302), which facilitates the remote device to select which collection items to use for generating the additive hash value. In this case, the additive hash values obtained during operation 306 can include additive hash values that the remote device computes using only collection items that satisfy the filter from the local device.

The system then determines whether the remote data collection matches the local data collection by comparing the remote additive hash value with a local additive hash value (operation 308). If the remote and local additive hash values match, the system does not have to synchronize the current data collection and proceeds to determine whether there is another data collection to synchronize (operation 312). If there is another data collection that exists at the local and remote client devices, the system returns to operation 306 to obtain a remote additive hash value for this data collection.

However, if the system determines at operation 308 that the remote and local additive hash values do not match (e.g., the data collection is not synchronized at the local and remote devices), the system synchronizes the structured names for the data collection at the local and remote devices (operation 310). Recall that the system does not have to synchronize the content items of the data collection with the remote item. By synchronizing the structured names for the content items (which identifies a content item and its version), the system can issue an interest packet for these structured names to obtain the content items from any device on the network. Further, if the local user is not interested in the content data associated with a hash value (e.g., a movie file, or a subdirectory of the data collection), the system can store the hash value from the remote device to satisfy the synchronization operation, without having to obtain the content data behind the hash value.

Whenever the device finishes synchronizing the data collection with the remote device, the local device generates and stores an up-to-date aggregate hash value for the data collection. The system stores this aggregate hash value so that it is associated with a timestamp for the collection-synchronizing operation, and associated with the content items that the hash value represents. Over time, the system builds a history of aggregate hash values for the data collection, which allows the system to quickly determine whether a remote data collection matches a previous version of the local data collection, and which content items are associated with this previous version. The local device can limit the amount of storage that is allocated for historical hash values, given that the usefulness of a historical hash value diminishes with time as the other devices synchronize their data collection to the current version.

In some embodiments, when the system determines that the current version of the remote and local data collections do not match, the system can simplify the synchronization operation by determining whether the remote data collection matches a prior version of the local data collection. If so, the system can conclude that the remote data collection is a subset of the local data collection, and can synchronize structured names with the remote device without having to perform an expensive item-by-item comparison operation with the remote data collection.

Figure 4:
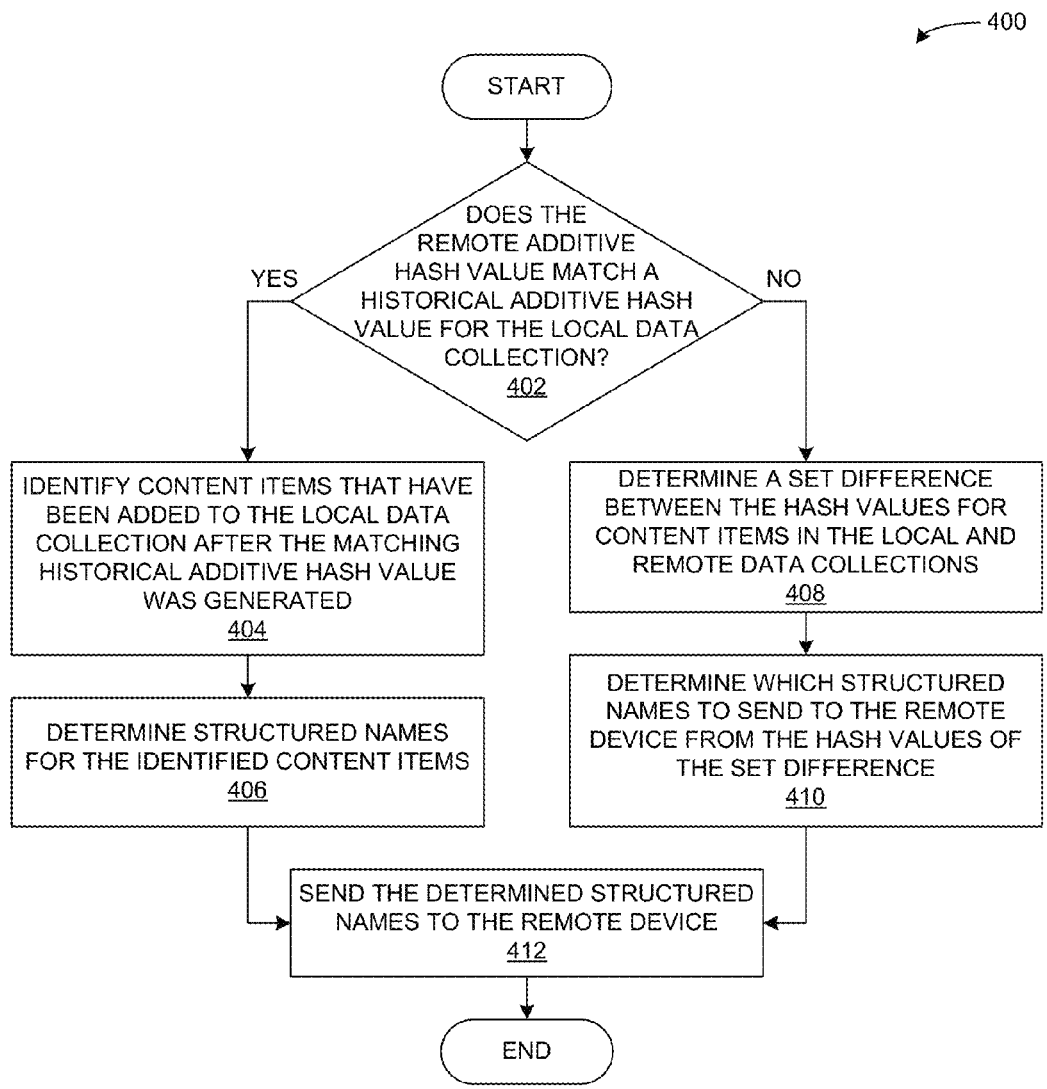
FIG. 4 presents a flow chart illustrating a method for providing structured names of local content items to a remote computing device in accordance with an embodiment.

FIG. 4 presents a flow chart illustrating a method 400 for providing structured names of local content items to a remote computing device in accordance with an embodiment. During operation, the system determines whether the remote additive hash value matches a historical additive hash value for the local data collection (e.g., determines whether the remote data collection is a subset of the local data collection) (operation 402). If so, the system identifies content items that have been added to the local data collection after the matching historical additive hash value was generated (operation 404), and determines structured names for the identified content items (operation 406). The system then sends these structured names to the remote device to synchronize the remote data collection with the local data collection (operation 412).

In some embodiments, the remote hash value does not match a local historical hash value when the remote data collection is not a strict subset of the local data collection. In some other embodiments, these hash values may not match when the local device has expunged (or did not store) a historical hash value that matches the remote hash value. In either case, the system determines a set difference between the hash values for content items in the local and remote data collections (operation 408), and determines which structured names to send to the remote device from the hash values of the set difference (operation 410). The system then proceeds to operation 412 to send these structured names to the remote device.

For example, the system can perform operation 408 by comparing individual hash values for content items between the local and remote devices to detect disparities. The system can obtain nested hash values for the data collection at the remote device, and searches through the local data collection to identify nested hash values of the local data collection that do not match a nested hash value of the remote data collection. A nested hash value can be a hash value for a content item of a data collection, or can be an additive hash value for a nested data collection. The system can obtain the remote device's nested hash values from the collection summary received during operation 304, or it can obtain these nested hash values by requesting them from the remote device (e.g., by requesting a collection summary for a sub-collection).

In some embodiments, the system can process these nested hash values of the local device to determine the structured names of the local data collection (and of any sub-collection) that do not exist at the remote data collection. Further, the system can perform method 400 to recursively synchronize various sub-collections of a collection hierarchy when the current additive hash values for the local and remote sub-collections do not match.

It can be inefficient to compare hash values for individual content items when a data collection is large. For example, it would be inefficient for the local and remote devices to exchange individual hash values for a data collection with 100,000 content items when the set difference includes only a few additional content items. In some embodiments, the system can perform set reconciliation (e.g., during operation 408) using a technique similar to Eppstein et al. (Eppstein, et al., "What's the Difference? Efficient Set Reconciliation without Prior Context," Proceedings of SIGCOMM11), which is hereby incorporated by reference.

To perform operation 408, the system can obtain a digest for the data collection of the remote device, and the system can also generate and send a digest for the local data collection to the remote device. The system can generate the digest by generating an invertible bloom filter (IBF) vector for the local data collection. For example, unlike other reconciliation techniques, the system can map each individual content item to k cells of the IBF table by using k hash functions ($H_k$) to process an identifier for the content item that is derived from the content item's structured name (e.g., using the existing hash value for the content item as the identifier, as opposed to using an identifier derived from the content item's data). The system also uses a hash function that corresponds to a respective cell ($H_c$) to generate a hash value from an aggregation of the identifiers for the content items that map to that cell.

Each cell of the IBF table stores a sum of the hash-value identifiers (idSum) for the content items that map to the cell, a sum of the hash values (hashSum), and a number of content items that are mapped to the cell (count). For example, to add a content item i (with an existing hash value $s_i$ for the data collection) to an IBF cell B[j], the system updates the IBF entry by computing the following:

$$B[j] \cdot idSum = B[j] \cdot idSum \oplus s_i \quad (1)$$

$$B[j] \cdot hashSum = B[j] \cdot hashSum \oplus H_c(s_i) \quad (2)$$

$$B[j] \cdot count = B[j] \cdot count + 1 \quad (3)$$

The system then uses the digest for the local data collection ($D_A$) and the digest of the remote data collection ($D_B$) to determine identifiers for the content items that make up the set difference between the local and remote data collections. For example, to compute the difference, $D_{A-B} = D_A - D_B$, the system performs the following computations for each cell i of the IBF tables for the local and remote content collections (IBFs $B_1$ and $B_2$, respectively):

$$B_3[i] \cdot idSum = B_1[j] \cdot idSum \oplus B_2[j] \cdot idSum \quad (4)$$

$$B_3[i] \cdot hashSum = B_2[i] \cdot hashSum \oplus B_2[i] \cdot hashSum \quad (5)$$

$$B_3[i] \cdot count = B_1[i] \cdot count - B_2[i] \cdot count \quad (6)$$

Thus, the IBF $B_3$ represents the digest difference $D_{A-B} = D_A - D_B$, and/or the system can generate an IBF $B_4$ that represents the digest difference $D_{B-A} = D_B - D_A$.

Then, the system can scan through IBF $B_3$ or $B_4$ to recover identifiers (hash values) for the content items that make up the set difference. The system first detects "pure" cells from the IBF table whose idSum value matches an identifier for a content item s in the set difference, and the system updates the IBF table to remove the content item s from all the IBF cells that it maps to. Then, the system iteratively detects other pure cells, and updates the IBF table to remove entries for other content items that make up the set difference, until either the IBF table is empty or no more pure cells exist. The system can then use the identifiers for the content items in the set difference (e.g., the hash values to these content items) to determine the structured names for the content items that need to be synchronized.

In some embodiments, the system can mitigate the scalability issue for exchanging hash values for a large collections by modifying a data collection as necessary to ensure that the collection's set of nested items does not reach a given maximum threshold. For example, if a nested collection corresponding to a given domain were to have a significantly large set of nested items (e.g., "/parc/home/ccn/" may have at least 1000 nested items), the system can lexicographically sort the names for the nested items, and groups them into sub-collections so that any nested sub-collection itself has a constrained maximum number of nested items that does not reach the maximum threshold (e.g., less than 1000 items). Doing so could cause the item named "/parc/home/ccn/test" to be stored within a data collection along the path "/parc/home/ccn/t/." Then, if only the file "test.txt" is modified within the collection "/parc/home/ccn," the system would only need to exchange hash values for the sub-collection "/parc/home/ccn/t" (e.g., during operation 208).

Using Filters to Synchronize a Portion of a Data Collection

When the system determines during operation 308 that the current version of the remote and local data collections do not match, the system can provide a local collection summary to the remote device so that the remote device can respond with the structured names that are missing at the local device. In some embodiments, the local device may not be interested in synchronizing all content items that exist at the remote device. For example, the local device may have a limited storage space or a limited network bandwidth, and may not be interested in receiving video or audio content. The system can provide a filter to the remote device to indicate selection criteria for selecting which content items are to be synchronized with the local device.

Figure 5:
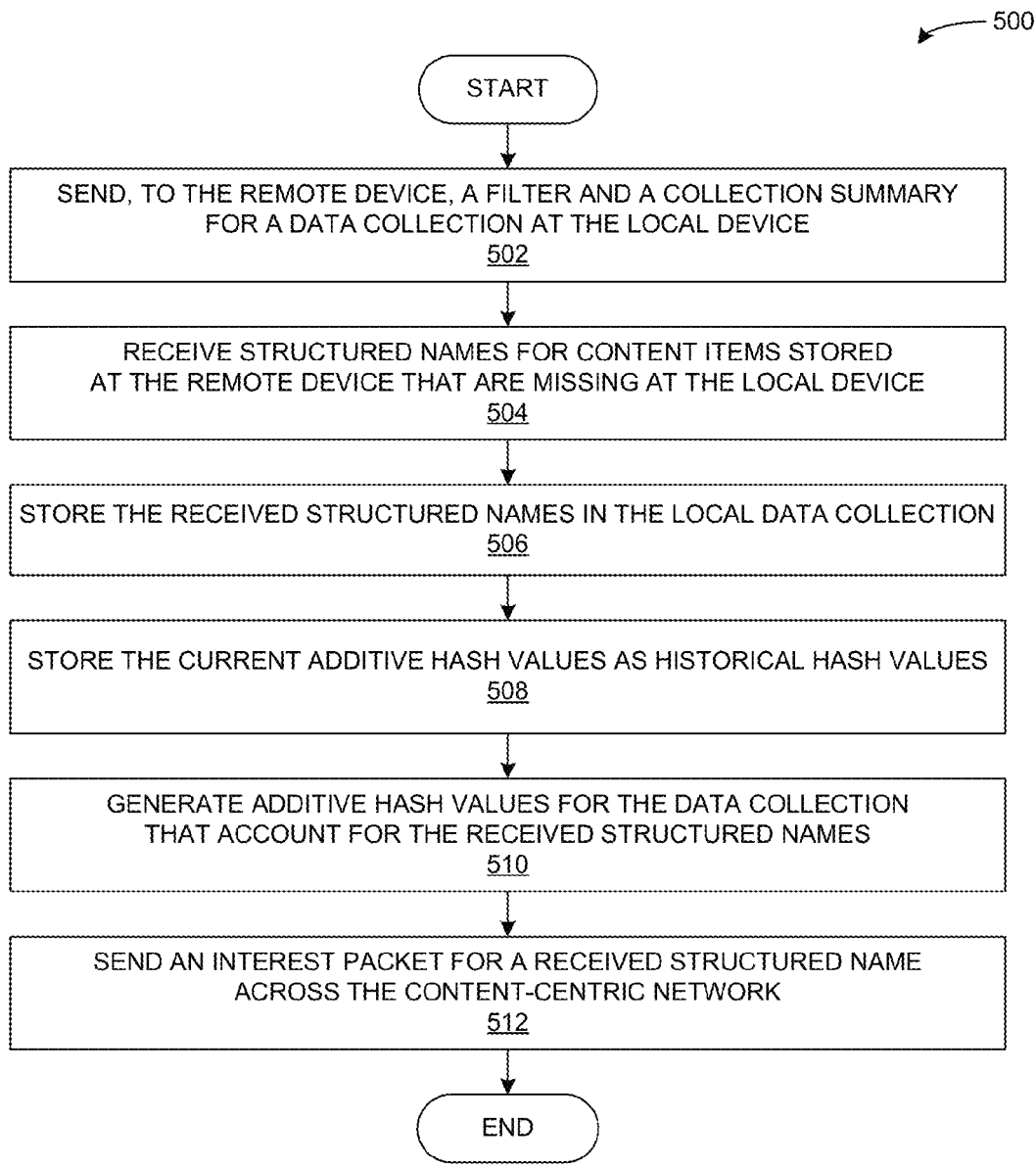
FIG. 5 presents a flow chart illustrating a method for updating a local data collection using structured names received from a remote computing device in accordance with an embodiment.

FIG. 5 presents a flow chart illustrating a method 500 for updating a local data collection using structured names received from a remote computing device in accordance with an embodiment. During operation, the system sends to the remote device a collection summary for a data collection at the local device (operation 502). The system can also send a filter to the remote device during operation 502, at which point the remote device uses the filter to select a root hash value and any historical additive hash value that satisfies the filter's selection criteria, or to generate the root hash value when necessary.

The system then receives structured names for content items stored at the remote device that are missing at the local device (operation 504), and stores the received structured names in the local data collection (operation 506). At this point, the current additive hash values for the data collection have become outdated (e.g., the root hash value and any nested additive hash values), so the system stores these additive hash values for the current data collection as historical hash values (operation 508). The system also generates new additive hash values for the updated data collection to account for the received structured names (operation 510). In some embodiments, while generating the new additive hash values, the system may also generate additive hash values for any filters that it has stored from other remote devices with which it frequently synchronizes data collections.

Recall that the system learns about new content items when it synchronizes a data collection with the remote device, but does not necessarily obtain these content items from the remote device. To obtain the new content items, the system can obtain these content items from any device of a content-centric network that is currently storing the correct version by sending an interest packet across the content-centric network for the received structured names (operation 512).

In some embodiments, the system can generate additive hash values for the local data collection (e.g., a root hash value and/or a filter hash value) when it receives a new filter from a remote device, or when it finishes synchronizing the local data collection with the remote device.

Figure 6:
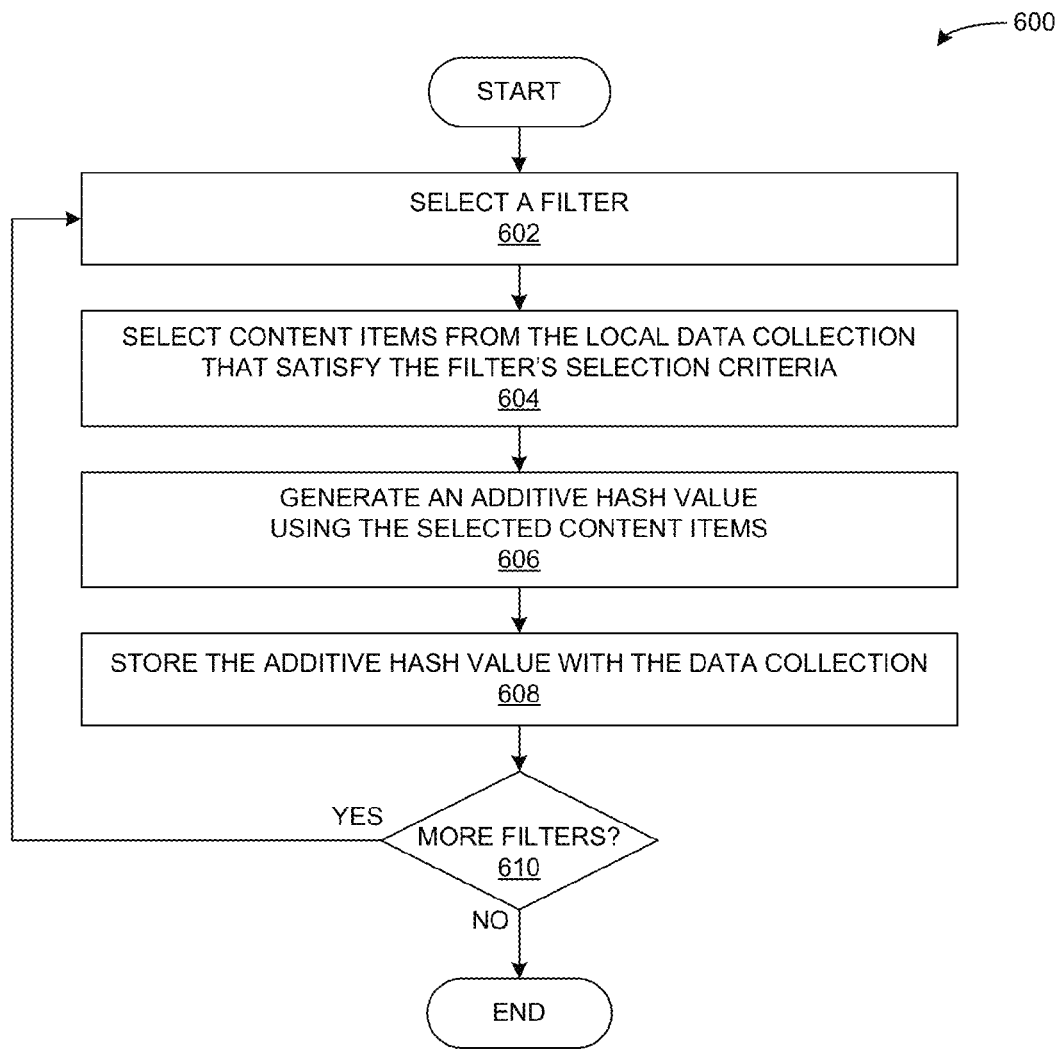
FIG. 6 presents a flow chart illustrating a method for generating additive hash values for an updated data collection in accordance with an embodiment.

FIG. 6 presents a flow chart illustrating a method 600 for generating additive hash values for an updated data collection in accordance with an embodiment. During operation, the system selects a filter (e.g., a filter received from a remote device) (operation 602), and selects content items from the local data collection that satisfy the filter's selection criteria (operation 604). The system then generates an additive hash value using the selected content items (operation 606), and stores the additive hash value with the data collection (operation 608).

The system then determines whether it needs to apply any other filters to the current version of the data collection (operation 610). If so, the system returns to operation 602 to select another filter.

Figure 7:
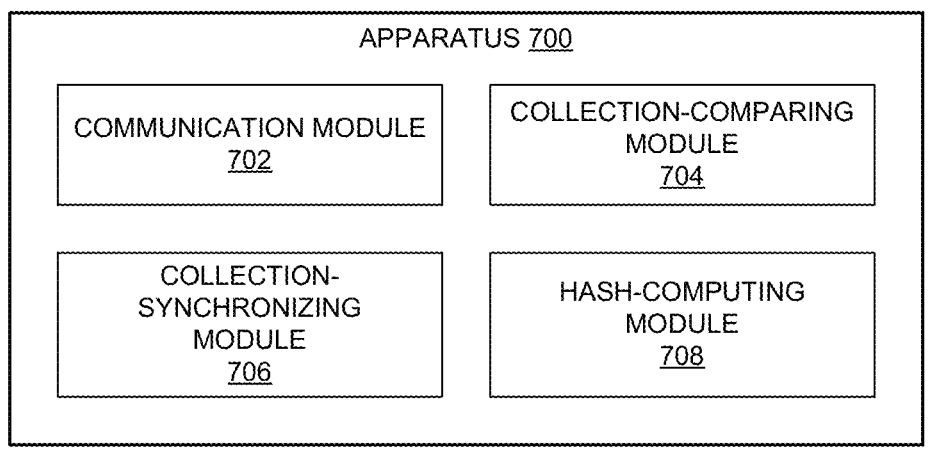
FIG. 7 illustrates an exemplary apparatus that facilitates synchronizing a data collection with a remote computing device in accordance with an embodiment.

FIG. 7 illustrates an exemplary apparatus 700 that facilitates synchronizing a data collection with a remote computing device in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, a collection-comparing module 704, a collection-synchronizing module 706, and a hash-computing module 708.

In some embodiments, communication module 702 can receive collection summaries for one or more data collections of a remote device. A respective collection summary includes at least one additive hash value that represents one or more content items of a data collection. Collection-comparing module 704 can compare, for a local data collection that also exists at the remote device, a local additive hash value for the local data collection with a remote additive hash value for the corresponding remote data collection at the remote device.

Collection-synchronizing module 706 can synchronize structured names for the local data collection and the remote data collection at the remote device. A structured name indicates a unique and persistent name for a content item independent of a storage location. Hash-computing module 708 can generate an additive hash value for the local data collection by performing an arithmetic function (e.g., an addition operation) on individual hash values for a plurality of content items in the data collection (e.g., content items that satisfy a filter's selection criteria).

Figure 8:
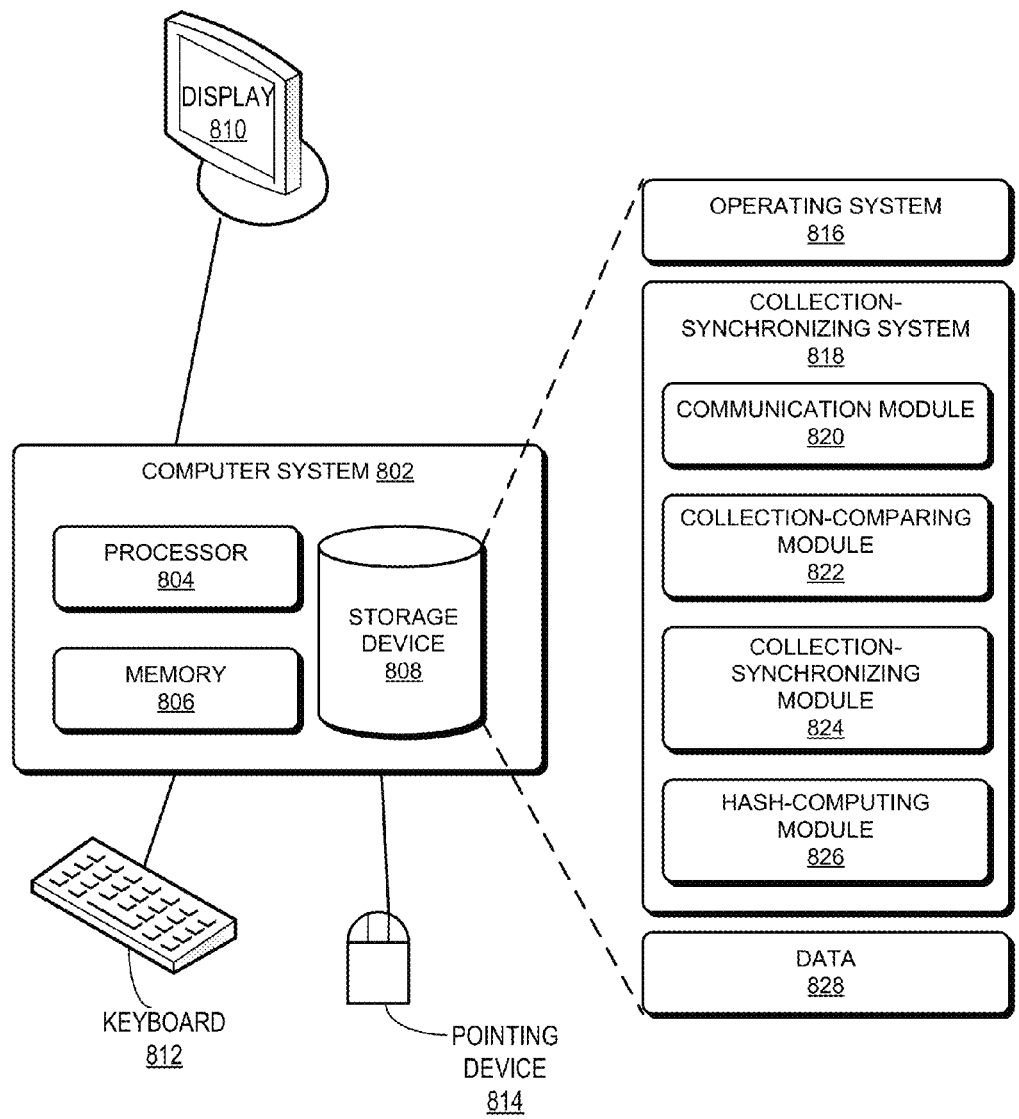
FIG. 8 illustrates an exemplary computer system that facilitates synchronizing a data collection with a remote computing device in accordance with an embodiment.

FIG. 8 illustrates an exemplary computer system 802 that facilitates synchronizing a data collection with a remote computing device in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, collection-synchronizing system 818, and data 828.

Collection-synchronizing system 818 can include instructions, which when executed by computer system 802, can cause computer system 802 to perform methods and/or processes described in this disclosure. Specifically, collection-synchronizing system 818 may include instructions for receiving collection summaries for one or more data collections of a remote device (communication module 820). A respective collection summary includes at least one additive hash value that represents one or more content items of a data collection. Further, collection-synchronizing system 818 can include instructions for comparing, for a local data collection that also exists at the remote device, a local additive hash value for the local data collection with a remote additive hash value for the corresponding remote data collection at the remote device (collection-comparing module 822).

Collection-synchronizing system 818 can also include instructions for synchronizing structured names for the local data collection and the remote data collection at the remote device (collection-synchronizing module 824). A structured name indicates a unique and persistent name for a content item independent of a storage location. Collection-synchronizing system 818 can also include instructions for generating an additive hash value for the local data collection by performing an arithmetic function on individual hash values for a plurality of content items in the data collection (hash-computing module 826).

Data 828 can include any data that is required as input or that is generated as output by the methods and/or processes described in this disclosure. Specifically, data 828 can store at least a data collection that includes one or more content items, an additive hash value for a data collection, a collection summary that includes at least one or more additive hash values for the data collection, selection criteria for selecting content items from a collection, filters that indicate selection criteria for generating an aggregate hash value and/or a collection summary.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   receiving, by a local computing device over a computer network, collection summaries for one or more data collections at a remote device, wherein a respective collection summary includes only a current additive hash value for each data collection, wherein a respective additive hash value represents a sum of hash values for two or more content items of a corresponding data collection;
   comparing, for a local data collection that also exists at the remote device, a current local additive hash value for a current version of the local data collection to a current remote additive hash value for a current version of the corresponding remote data collection at the remote device;

in response to determining that the current remote additive hash value does not match the current local additive hash value, comparing the current remote additive hash value to one or more historical local additive hash values that were generated for a previous version of the local data collection; and in response to determining that the current remote additive hash value matches a historical local additive hash value for the local collection, sending, to the remote device over the computer network, structured names for content items that have been added to the local data collection after the matching historical local additive hash value was generated.

2. The method of claim 1, further comprising synchronizing structured names for the local data collection with the remote device, wherein synchronizing the structured names involves:

comparing the current remote additive hash value to one or more historical local additive hash values for the local data collection; and responsive to determining that the received current remote additive hash value does not match a historical local additive hash value for the local data collection:

determining a set difference between hash values for content items in the local and remote data collections;

determining, based on the hash values of the set difference, structured names for content items from the local data collection that are missing from the remote device's data collection; and sending, to the remote device, the structured names for the identified content items.

3. The method of claim 1, further comprising:

receiving a filter from the remote device, wherein the filter indicates selection criteria for selecting content items that are desired by the remote device;

determining, from the local data collection, a set of content items that satisfy the filter's selection criteria;

generating the current local additive hash value using the content items that satisfy the filter's selection criteria; and synchronizing structured names for the local data collection with the remote device, wherein synchronizing the structured names involves:

generating a filtered collection of content items that includes, from the content items that satisfy the filter's selection criteria, one or more content items that are missing from the remote data collection; and sending structured names, for content items in the filtered collection, to the remote device.

4. The method of claim 1, further comprising:

sending, to the remote device, a collection summary for the local data collection;

receiving structured names for one or more content items stored in the remote data collection that are not in the local data collection; and storing the received structured names in the local data collection.

5. The method of claim 4, further comprising:

sending an interest packet for at least one of the received structured names, wherein the interest packet facilitates receiving a content item identified by the structured name from any computing device of a computer network that stores the content item.

6. The method of claim 4, further comprising:

responsive to synchronizing the structured names, generating one or more additive hash values for the local data collection based on the received structured names for the content items that are not in the local data collection.

7. The method of claim 1, wherein the local data collection includes one or more nested hash values, wherein a nested hash value indicates a hash value for a content item of the local data collection or for a nested collection of content items of the local data collection; and wherein the received collection summary further includes one or more nested hash values of the remote data collection.

8. A non-transitory computer-readable storage medium storing instructions that when executed by a computer cause the computer to perform a method, the method comprising:

receiving, over a computer network, collection summaries for one or more data collections at a remote device, wherein a respective collection summary includes only a current additive hash value for each data collection, wherein a respective additive hash value represents a sum of hash values for two or more content items of a corresponding data collection;

comparing, for a local data collection that also exists at the remote device, a current local additive hash value for a current version of the local data collection to a current remote additive hash value for a current version of the corresponding remote data collection at the remote device;

in response to determining that the current remote additive hash value does not match the current local additive hash value, comparing the current remote additive hash value to one or more historical local additive hash values that were generated for a previous version of the local data collection; and in response to determining that the current remote additive hash value matches a historical local additive hash value for the local collection, sending, to the remote device over the computer network, structured names for content items that have been added to the local data collection after the matching historical local additive hash value was generated.

9. The storage medium of claim 8, wherein the method further comprises synchronizing structured names for the local data collection with the remote device, and wherein synchronizing the structured names involves:

comparing the current remote additive hash value to one or more historical local additive hash values for the local data collection; and responsive to determining that the received current remote additive hash value does not match a historical local additive hash value for the local data collection:

determining a set difference between hash values for content items in the local and remote data collections;

determining, based on the hash values of the set difference, structured names for content items from the local data collection that are missing from the remote device's data collection; and sending, to the remote device, the structured names for the identified content items.

10. The storage medium of claim 8, wherein the method further comprises:

receiving a filter from the remote device, wherein the filter indicates selection criteria for selecting content items that are desired by the remote device;

determining, from the local data collection, a set of content items that satisfy the filter's selection criteria;

generating the current local additive hash value using the content items that satisfy the filter's selection criteria; and synchronizing structured names for the local data collection with the remote device, wherein synchronizing the structured names involves:
- generating a filtered collection of content items that includes, from the content items that satisfy the filter's selection criteria, one or more content items that are missing from the remote data collection; and
- sending structured names, for content items in the filtered collection, to the remote device.

11. The storage medium of claim 8, wherein the method further comprises:
- sending, to the remote device, a collection summary for the local data collection;
- receiving structured names for one or more content items stored in the remote data collection that are not in the local data collection; and
- storing the received structured names in the local data collection.

12. The storage medium of claim 11, wherein the method further comprises:
- sending an interest packet for at least one of the received structured names, wherein the interest packet facilitates receiving a content item identified by the structured name from any computing device of a computer network that stores the content item.

13. The storage medium of claim 11, wherein the method further comprises:
- responsive to synchronizing the structured names, generating one or more additive hash values for the local data collection based on the received structured names for the content items that are not in the local data collection.

14. The storage medium of claim 8, wherein the local data collection includes one or more nested hash values, wherein a nested hash value indicates a hash value for a content item of the local data collection or for a nested collection of content items of the local data collection; and
- wherein the received collection summary further includes one or more nested hash values of the remote data collection.

15. An apparatus, comprising:
- a communication module to receive, over a computer network, collection summaries for one or more data collections at a remote device, wherein a respective collection summary includes only a current additive hash value for each data collection, wherein a respective additive hash value represents a sum of hash values for two or more content items of a corresponding data collection;
- a collection-comparing module to:
  - compare, for a local data collection that also exists at the remote device, a current local additive hash value for a current version of the local data collection to a current remote additive hash value for a current version of the corresponding remote data collection at the remote device; and
  - in response to determining that the current remote additive hash value does not match the current local additive hash value, compare the current remote additive hash value to one or more historical local additive hash values that were generated for a previous version of the local data collection;
- a collection-synchronizing module, wherein in response to determining that the current remote additive hash matches the historical local additive hash value for the local collection, the collection-synchronization module is operable to send, to the remote device over the computer network, structured names for content items that have been added to the local data collection after the matching local historical hash value was generated.

16. The apparatus of claim 15, wherein the collection-comparing module is further configured to:
- compare the current remote additive hash value to one or more historical local additive hash values for the local data collection; and
- responsive to determining that the received current remote additive hash value does not match a historical local additive hash value for the local data collection, configure the collection-synchronizing module to:
  - determine a set difference between hash values for content items in the local and remote data collections;
  - determine, based on the hash values of the set difference, structured names for content items from the local data collection that are missing from the remote device's data collection; and
  - send, to the remote device, the structured names for the identified content items.

17. The apparatus of claim 15, wherein the communication module is further configured to receive a filter from the remote device, wherein the filter indicates selection criteria for selecting content items that are desired by the remote device;
- wherein the apparatus further comprises a hash-generating module to:
  - determine, from the local data collection, a set of content items that satisfy the filter's selection criteria; and
  - generate the current local additive hash value using the content items that satisfy the filter's selection criteria; and
- wherein the collection-synchronizing module is further configured to:
  - generate a filtered collection of content items that includes, from the content items that satisfy the filter's selection criteria, one or more content items that are missing from the remote data collection; and
  - send structured names, for content items in the filtered collection, to the remote device.

18. The apparatus of claim 15, wherein the communication module is further configured to:
- send, to the remote device, a collection summary for the local data collection;
- receive structured names for one or more content items stored in the remote data collection that are not in the local data collection; and
- store the received structured names in the local data collection.

19. The apparatus of claim 18, wherein the communication module is further configured to:
- send an interest packet for at least one of the received structured names, wherein the interest packet facilitates receiving a content item identified by the structured name from any computing device of a computer network that stores the content item.

20. The apparatus of claim 18, further comprising a hash-generating module operable to generate one or more additive hash values for the local data collection in response to the communication module receiving the structured names for the content items that are not in the local data collection.

21. The apparatus of claim 15, wherein the local data collection includes one or more nested hash values, wherein a nested hash value indicates a hash value for a content item of the local data collection or for a nested collection of content items of the local data collection; and wherein the received collection summary further includes one or more nested hash values of the remote data collection.

* * * * *